United States Patent
Cochran et al.

(10) Patent No.: US 7,426,279 B2
(45) Date of Patent: Sep. 16, 2008

(54) ELECTROMAGNETIC AUDIO AND DATA SIGNALING TRANSDUCERS AND SYSTEMS

(76) Inventors: James L. Cochran, 3228 Sundown Dr., Berthoud, CO (US) 80513; Marilyn Valdez-Campbell, 4359 Chateau Dr., Loveland, CO (US) 80538

( * ) Notice: Subject to any disclaimer, the term of this patent is extended or adjusted under 35 U.S.C. 154(b) by 518 days.

(21) Appl. No.: 10/860,054

(22) Filed: Jun. 4, 2004

(65) Prior Publication Data
US 2004/0258261 A1 Dec. 23, 2004

Related U.S. Application Data

(60) Provisional application No. 60/477,846, filed on Jun. 11, 2003.

(51) Int. Cl.
*H04R 25/00* (2006.01)
(52) U.S. Cl. ........................ 381/331; 379/443
(58) Field of Classification Search .................. 381/79, 381/312, 315, 322, 326; 379/443, 444
See application file for complete search history.

(56) References Cited

U.S. PATENT DOCUMENTS

| | | | |
|---|---|---|---|
| 3,938,018 A | 2/1976 | Dahl | 320/140 |
| 4,590,427 A | 5/1986 | Fukushima et al. | 324/318 |
| 2001/0055386 A1 | 12/2001 | Waldron et al. | 379/444 |
| 2002/0121948 A1 | 9/2002 | Giday et al. | 335/18 |

*Primary Examiner*—Walter F Briney, III
(74) *Attorney, Agent, or Firm*—Bacon & Thomas, PLLC

(57) ABSTRACT

An electromagnetic field signal communications system (100) is based on a specially configured sending transducer (30), having electrical conductors (32) wound onto a generally circular core (33) including an air gap (34) from which its electromagnetic fields (40) are generated when excited with input electrical audio or data (20) signals. The transducer (30) transmits by projecting these electromagnetic fields (40) onto adjacent signal receiving transducers (51/56) that transform the electromagnetic field (40) into proportional electrical signals. The electromagnetic fields (40) are transformed by a receiving transducer (51) located in an adjacent hearing aid device (50) such that input audio electrical input signals, which are processed by circuitry (53), bypass the hearing aid microphone (52) and are routed to the eardrum speaker (55). The transducer's (30) effectiveness is due in part to its ability to reduce environmental electromagnetic interference when excited with an electrical excitation signal (18) in lieu of or in addition to voice or date signals (20).

15 Claims, 3 Drawing Sheets

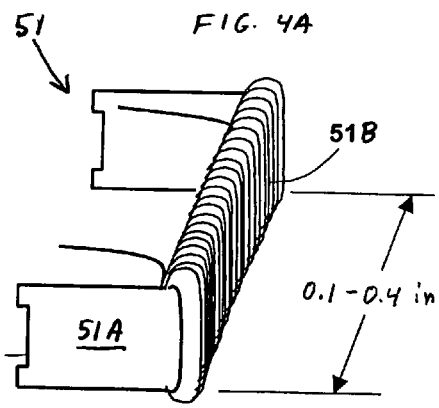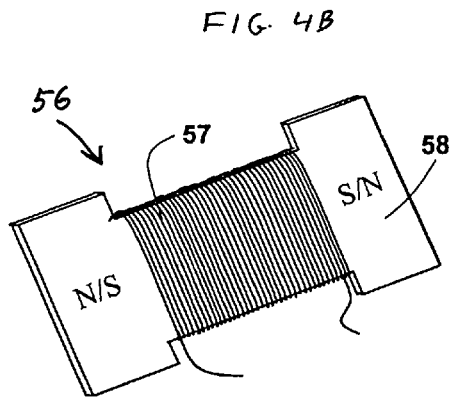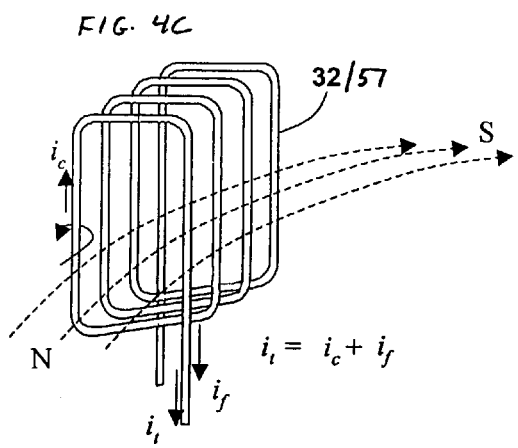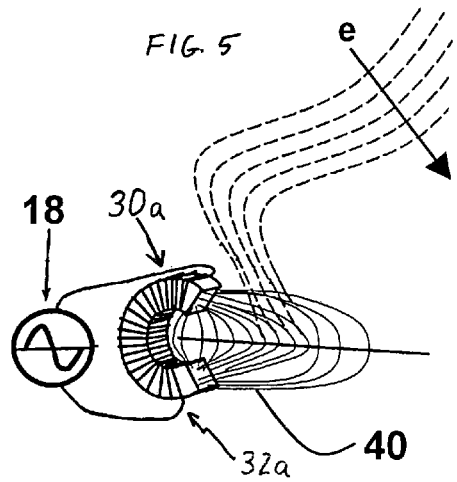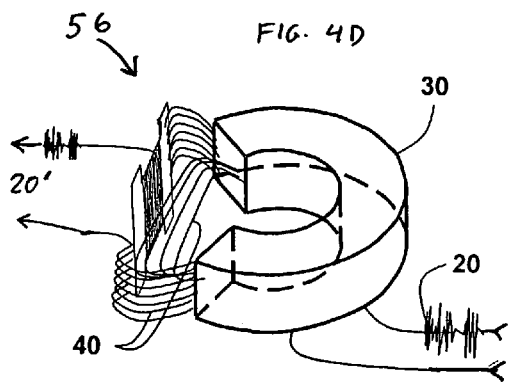

US 7,426,279 B2

ELECTROMAGNETIC AUDIO AND DATA SIGNALING TRANSDUCERS AND SYSTEMS

This application claims the benefit of the U.S. Provisional Application Ser. No. 60/477,846 filed on Jun. 11, 2003.

TECHNICAL FIELD

The present invention relates generally to electromagnetic signal transmission between devices that have electromagnetic sending transducers and devices that have electromagnetic receiving transducers, for transmitting signals therebetween. More particularly, the present electromagnetic signal transmission methods and apparatus apply to signals laden with voice and/or data information for use by hearing aids, cochlear implants as well as with other electronics equipment, all of which may have communication dependencies requiring ultra minimum power. The resulting systems and devices call for miniaturized and diversified package shapes, in addition to high signal to noise ratios.

BACKGROUND

Since the 1950's and the initial invention of the hearing aid t-coil for use in receiving electromagnetic audio signals from telephones with electromagnetic voice coils, improvements have been continuously sought. This alternative to the hearing aid microphone input avoids the feedback problems of the acoustic loop associated with speakers and microphones. Later when voice coils shrank to reduce power for cordless and wireless phones, auxiliary coils were added to speaker assemblies to enhance the electromagnetic fields and volume controls were added to claim the label of "hearing aid compatible" (HAC) phones.

Since these early days, the environment has changed, rapidly going from wired phones to cordless to wireless and to other methods of utilizing telecommunications devices such as phone integrated personal digital assistants, computers with voice and data capabilities, entertainment devices with headsets as well as short range radios evolving from the citizens band system. Many of these recent and advanced devices have to be synchronized to communicate in regard to data transfer and many transmit and check protocols for data transmission. In the realm of the audible, people with hearing aids and cochlear implants are finding difficulties in accessing the Internet as well as participating in day to day communications over the growing list of electronic communication devices. Many of these devices are not compatible with the needs of the hearing impaired. The electronic noise emitted from the circuitry of most of these devices creates electronic interference and results in acoustic noise in hearing aids and cochlear implants. Many of these devices fall short of meeting regulatory criteria for electromagnetic devices. This occurs where they are creating noise in the environment affecting other electronic equipment as well as adversely affecting the hearing impaired. Many hearing aid users simply remove their hearing aids and turn up any volume control to listen on phones or headsets and try to make the best of it. Inventions that simply turn up the volume are not very effective because hearing loss is usually frequency dependent. Hearing aids are necessary and they can compensate for loss at a given frequency, helping balance the hearing profile so that volume is more effective and some frequencies are not over driven so others can be heard.

There are many aspects against which to evaluate devices that are going to be more helpful to the hearing impaired in communicating with these recent and advanced devices and yet there are other aspects that can facilitate communication between devices utilizing the similar attributes of this invention. The following prior art is evaluated against the following specific aspects of this invention. These aspects are: the location and mounting environments and arrangements of the transducer, the transducer structure, content, field shape and intensity, power consumption, signal characteristics, noise reduction, and requirements of adjacent items.

Prior art most representative of attempts to assist the hearing impaired are U.S. Pat. No. 5,796,821 to Crouch "Hearing Aid Telephone Interconnect System" (1999), U.S. Pat. No. 6,320,959 to Crouch (2001) "Hearing Aid Telephone Interconnect System" and U.S. Pat. No. 6,438,245 to Taenzer (2002) "Hearing Aid Communication Earpiece" disclose similar approaches. U.S. Pat. Nos. 5,796,821 and 6,320,959 are essentially the same patent with some minor claims added to the second patent. The basic disclosure is the simultaneous routing via a cable connection of a telephone audio signal to a separate earpiece hooked over the ear and contacting a behind the ear hearing aid and the conventional handset. The earpiece contains an open air looped coil that electromagnetically couples with a t-coil mounted inside the behind the ear hearing aid. Through this coupling the audio signal is transferred and the hearing aid switch is set to t-coil allowing the signal to be transferred to the hearing aid amplifier. This avoids feedback since the microphone is out of the acoustic loop and allows the hearing aid volume to be turned up fully. However, the extra cord and earpiece are additional burdens for the hearing impaired to handle and to keep from getting tangled with other cords. Essentially this open air loop is large and serves the same function as the auxiliary coil added to the old voice coil speakers in the handsets to achieve a classification of "hearing aid compatible". U.S. Pat. No. 6,438,245 also discloses an additional earpiece mounted to the hearing aid but with the addition of an acoustic tube from the earpiece out to the microphone of the hearing aid. The earpiece also contains a transmitting coil to couple to a t-coil. The earpiece also has two-way wireless communication capabilities. However, this design still has the burden of an additional item and complexity of mounting it and removing it from the hearing aid.

U.S. Patent Application 20010055386 "Method and Apparatus for a Hearing Aid Coupler System" adds a new aspect to the coupling in that it is back in the handset where no additional cables or attachments are required. The coil is designed to be mounted in the handset above the speaker in the preferred embodiment with the center line of the toroid coil design parallel to the face of the handset earpiece. However, the highest field intensity for the toroid coil is in the center of the coil. Tests have indicated that the coil acting by itself is inferior in performance to conventional speakers with the auxiliary coil. Therefore, the toroid coil is misaligned in the configuration and not in intimate proximity of the hearing aid t-coil further reducing its effectiveness.

U.S. Pat. No. 5,615,229 to Sharma (1997) "Short Range Inductively Coupled Communication System Employing Time Variant Modulation" also utilizes the t-coil in a hearing aid. However, the transmitting coil to the t-coil is a large neck-worn inductive loop that is driven by an amplified signal. Although claims are made to smaller loops, the preferred embodiment is an open air loop requiring extra apparatus and cables. A claim is also made of adding a ferrite core but it is left to assume an axial configuration which essentially is a toroid but the essential implementation is assumed to still require a separate item with cabling, thus creating excessive equipment. Further the signal(s) delivered to the inductive loops are amplified and require considerable circuitry to process the signal to the inductive loop. Although noise susceptible baseband is avoided with the time variant RF signal, processing the baseband signal is reverted to in transmitting from the inductive loop to the t-coil.

U.S. Pat. No. 6,381,308 to Cargo (2002), U.S. Pat. No. 4,361,733 to Marutake (1982), U.S. Pat. No. 4,908,869 to Lederman (1990), U.S. Pat. No. 6,516,075 to Jacobs (2003) U.S. Pat. No. 5,276,910 to Buchele (1994) all utilize the large inductive loop coil or a similar configuration, also referred to as antenna, in one form or another or derivatives thereof to transmit to the hearing aid t-coil. Some loops are tied to a location in the room versus being attached to the body. Use of a large loop requires amplification circuitry and if the loop is located in the room, the effectiveness is limited to that immediate area. All these devices require an additional item separate from the source signal device such as a phone (wired, cordless or wireless), or entertainment headset. The loop is large, requires connections and transmits amplified electromagnetic fields in all directions in the immediate environment.

U.S. Pat. No. 5,086,464 to Groppe (1992) "Telephone Headset for the Hearing Impaired" does not require a hearing aid but uses a headset in which to apply an audio signal from a phone through its own microphone or an audio signal through its own built in t-coil to receive electromagnetic field inputs from the voice coil in the speaker. This design was perceptive in recognizing the need for separate volume and tone controls for each ear, since the compensation of a hearing aid is not part of this design. However, this again is a separate and bulky device that must be carried and utilized separate from the signal source, a phone. If the quality of the signal varies with the use of different phones, adjustments to volume must be made to each ear piece.

U.S. Pat. No. 5,042,084 Daly (1991) and U.S. Pat. No. 5,069,210 to Juetter (1991) disclose methods to transmit audio signals to implanted receiving transducers requiring the involvement of sophisticated circuitry in doing this. U.S. Pat. No. 5,042,084 utilizes an inductive coil to receive both audio and RF input. The RF transmitting coil requires close alignment of its coil core to the receiving coil core to avoid signal detuning. U.S. Pat. No. 5,069,210 also uses an RF scheme to transmit an RF signal to the implanted receiver. Both disclosures require implanted circuitry to decode the RF signals back to simulate a normal audio signal that gets translated into the acoustic equivalent of what the ear nerve interface requires. The additional signal processing and associated circuitry increases the cost and the size of the implant. Many newer cochlear implants are including a small t-coil that directly supports electromagnetic transmission of audio signal from a sending transducer to the t-coil from which the different frequencies are derived.

Besides audio signal transmission for purposes of supplying an audible signal, other signal types may be transmitted through such means at a rapid rate for the purpose of logic data transfer or exchange between devices without the restrictions of cables. U.S. Pat. No. 4,864,633 to Chatelot (1989) discloses a means to accomplish this by using a tuned transmitting-receiving coil to inductively couple with a movable receiving and transmitting coil. Through this arrangement a high rate data exchange can occur. However, the size of the coils and the circuitry required would be prohibitive in today's wireless technology and mobile environment. Reduction in size would weaken the signal significantly in attempts to miniaturize, which leads to signal to noise ratio problems.

Another disclosure that focuses on voice and data transmission is in U.S. Pat. No. 4,584,707 to Goldberg (1986) wherein transmission and reception is accomplished through magnetic lines of induction from a base station and at least one mobile station. Voice is transmitted at one frequency and data at a higher frequency. The induction coupling is through antenna versus coils. The antenna are worn by the person as the mobile unit and are again large and operate at radio frequencies which require circuit processing in the receivers to get the data and voice back into usable form leading to complexity and costs.

U.S. Pat. No. 5,293,400 to Monod (1994) uses the inductive principle to interconnect sections of a data bus. The inductive transducer is a flat spiral winding (having no core) that is printed on a circuit board and the transmitter is aligned to a receiver on a parallel and adjacent printed circuit board with the alignment on the centerlines of the two flat spiral windings. Each spiral winding alternates function from transmitting to receiving as required. Data flow rates on an RS 232 bus have achieved data flow rates of 300 kbits/s. However, the intent here is to fix these inductors relative to each other and the spirals are relatively large at about a 2 inch diameter. The size, printed circuit implementation and the flat nature make this embodiment fragile for movable devices that need to interconnect versus fixed bus sections on printed circuit boards.

U.S. Pat. No. 5,084,864 to Turnbull (1992) relates another version of inductive transmission for the purpose of communicating information. This discloses the use of RF signals from a base station forming a network over balanced transmission lines (2) with a plurality of remote units comprised of U-shaped couplers in proximity over the transmission lines and connected to RF receivers or senders such that they can communicate over this network. These U-shaped couplers are positioned flat and parallel to the transmission lines. The U shaped couplers were formed of a thin flat bare piece of metal, each leg being parallel to the two transmission lines and connected to RF senders or receivers. Of course this embodiment is not mobile and has to remain adjacent to wherever the transmission lines are placed. The couplers are made for RF usage and not direct signal transmission and for transfer of data limited to devices that are positioned along the transmission lines.

OBJECTS OF THE INVENTION

It is therefore a primary object of the present invention to provide improved methods and apparatus for effecting electromagnetic transfer of voice and data signals between systems employing sending and receiving transducers.

A further object of the present invention is to provide a sending transducer of miniature size which provides the capability of producing a focused field of high intensity.

A still further object of the present invention is to provide low power consuming sending transducers for electromagnetically transmitting audio or data signals, such as those from a handset including varied types of phones or handheld radios, to like receiving transducers or conventional inductors such as t-coils.

A yet further object of the present invention is to provide transmission of signals through a sending transducer while clearing up environmental electromagnetic interference, and in a proportional manner to facilitate use by t-coils in hearing aids and in cochlear implants.

Additional objects of the present invention are:

[a] to provide an electromagnetic interference reduction means by placing the transducer in proximity to areas and exciting the coil in such a way as to reduce the effects of unwanted electromagnetic interference while meeting electromagnetic emission specifications;

[b] to provide transmission of signals containing data from device to device irrespective of protocol used for the transfer;

[c] to provide an electrical signal to an electromagnetic field transducer that on a wattage basis, on a weight basis and on a volume basis will provide the strongest receiving transducer response in audio volume and data speed.

In addition to the above objects, the methods and apparatus disclosed in the present invention, and especially the specially configured transducer(s) described, provide the following advantages:

a. Its small size which allows it to be fitted into small handheld devices.

b. Its negligible weight, keeping the weight of portable and mobile devices down.

c. Its ultra-low power consumption (in the microwatt range) to save battery power and minimally impact internal circuit loads.

d. Its low installed cost makes it attractive for fitting directly into phone handsets that are wired, cordless, and wireless as well as in headsets, computers and personal digital assistants.

e. Its strong focused electromagnetic field for use by a receiving transducer creating an inherent form of amplification that translates into higher volume.

f. Its hand manipulation capability for volume control is feasible because a focused field can be moved away from the receiving transducer to reduce the resulting volume.

g. Its noise reduction characteristics of the strong transducer produced varied frequency driven electromagnetic field that can nullify random environmental electromagnetic fields.

h. Its improvement in the signal to noise ratio based on noise reduction and the stronger signal field intensity with this transducer.

i. Its ability to be implemented as a standalone audio transmitter or to be implemented in series or in parallel with speakers.

j. Its ability to reduce electromagnetic interference generated from cordless and wireless phones as well as other sources radiating into hearing aid circuitry since it transmits clearly even through noisy backgrounds.

k. Its ability to easily shield its output to protect nearby items sensitive to electromagnetic fields and to easily be shielded from forms of electromagnetic interference from sources in its environment.

l. Its allowance to be used as normal-appearing equipment for the hearing impaired, free of any auxiliary cables, attachments and bulky hardware items.

m. Its ability to be used as an electromagnetic interference noise reduction means by exciting the transducer with frequencies that reduce the effects of electromagnetic interference while meeting emission specifications and its use of a highly permeable magnetic core that attracts electromagnetic fields.

n. Its ability to transfer audio data and power signals. Data and power inherent in the signal can be transferred between devices to share files irrespective of protocol and transfer power to receiving circuits.

o. Transducers can be used in arrangements of multiples to broaden the electromagnetic fields, create multiple channels for data exchange or other beneficial outcomes in performance.

p. The transducer can be a transmitter or sender, or alternately a receiver.

In accordance with the present invention an electromagnetic inductive field communications system is based on a specially configured signal sending transducer having electrically conductive windings wound around a magnetic permeable core material. Its core takes on the form of a closed loop configuration but having a discontinuous portion, the void of which forms an air gap bounded by core pole faces. The sending transducer is mounted in a device that has an audio signal source such as a phone handset, headsets or handheld radios. The air gap of the transducer responds to electrical audio input signals from the source devices thereby transforming them into electromagnetic fields, which are projected from the source device's handset placed up to the user's ear toward a specially configured receiving transducer mounted in a hearing aid. The receiving transducer transforms the electromagnetic field back into a proportional electrical signal that is processed by the hearing aid circuitry to the hearing aid speaker. This process therefore bypasses the feedback fraught acoustic loop often initiated by the microphone, thus achieving fully equivalent or superior results.

BRIEF DESCRIPTION OF THE DRAWINGS

Additional objects and advantages of the invention will become apparent to those skilled in the art as the description proceeds with reference to the accompanying drawings, wherein:

FIG. 4 shows the various core geometries and winding arrangements contemplated for use as receiving transducers, as well as the additive effects of signal voltages induced in their windings via an illustrative field coupling lines pictorial; and FIG. 5 shows electromagnetic interference noise reduction circuitry, in simplified form, ideally adapted for use in lieu of or in addition to the sending transducer of FIG. 3A.

BEST MODE FOR CARRYING OUT THE INVENTION

Figure 1:
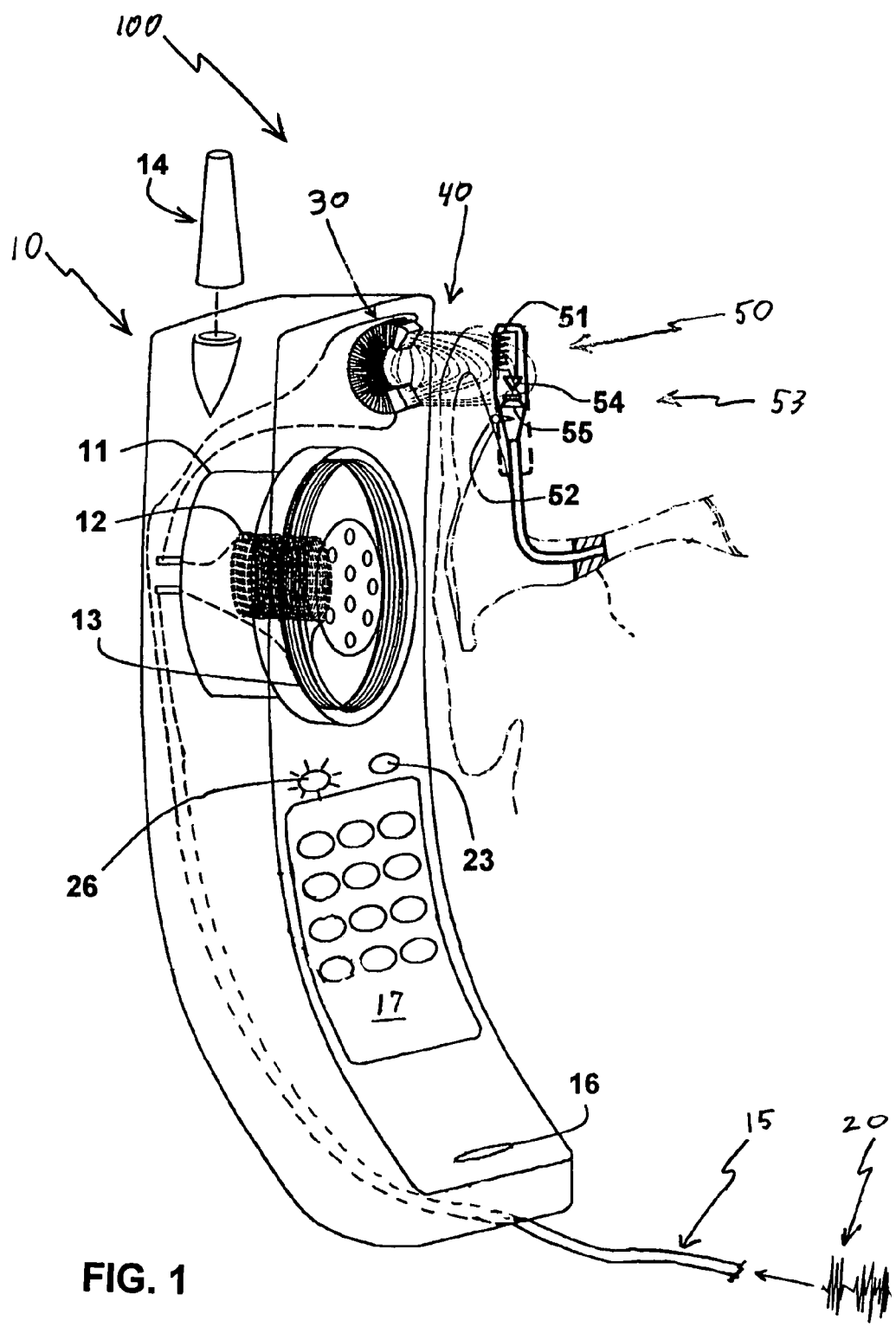
FIG. 1 is a highly schematic view of a system employing a transducer arrangement according to the present invention, the system comprising, illustratively, a wired telephone handset in communication with a behind-the-ear hearing aid.

Referring now to FIG. 1 there is shown a highly schematic view of a hearing aid related system employing a preferred embodiment of a transducer arrangement according to the present invention. The system 100 depicts a signal producing unit 10 in magnetic communication with a behind-the-ear hearing aid 50. Whereas the unit 10 is shown in this embodiment as being a wired telephone handset, the full range of other audio signal producing devices are contemplated herein. These others may include cordless and wireless handsets, as well as phone linked PDA's, two-way radio handsets, and the like. Conventionally, the wired phone handset 10 includes a speaker 11 driven by a standard voice coil 12. An auxiliary open air coil 13 is included to provide hearing aid compatibility status for the handset 10. The handset 10 may further include other conventional elements such as an antenna 14, an interconnecting cord 15, a microphone 16, an input keyboard 17, as well as a transmission mode switch 23 and a status indicator light 26.

Figure 2:
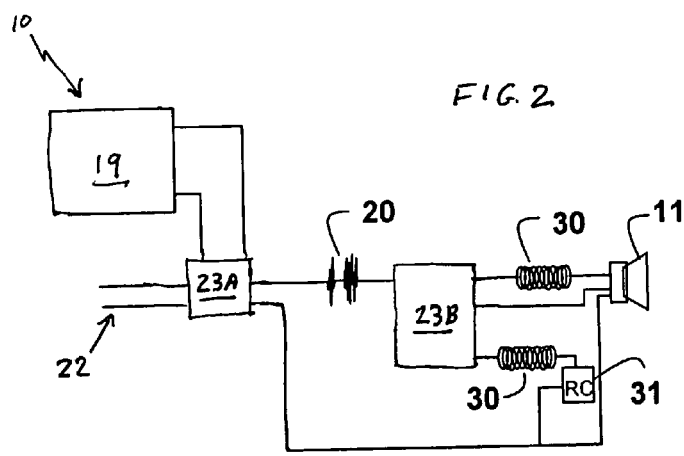
FIG. 2 is a highly schematic circuit diagram showing the flexible input/output capabilities of the voice and data selecting portion within a source producing device.

An overview description of system operation is now facilitated with reference to FIG. 2, as well as with continued reference to FIG. 1. In FIG. 2 an input electrical audio signal 20 may be provided either from a source 19 (which may be the handset 10 of FIG. 1, or from any of the other sources enumerated above) or simply from any signal source, such as 22, intended for use by the audio speaker 11. Selection of the desired signal source is made by actuation of an input selector switch 23A. Switch 23A and an output selector switch 23B of FIG. 2 may be portions of mode switch 23. The electrical input signal 20 can be processed in a serial relationship through both a sending transducer 30 and the speaker 11. Alternatively, the electrical input signal 20 can be sent by parallel circuit to either the speaker 11 or the transducer 30 as controlled by the output switch 23B. The mode switch 23 can have three logical positions as follows: transducer 30, speaker 11 or both in which case the electrical input signal can be sent simultaneously to both the transducer 30 and the speaker 11. If simultaneous operation is always required, the switch may be inactivated (or removed) so that the transducer 30 plus possible RC circuitry 31 and the speaker 11 always operate simultaneously in parallel. In accordance with the preferred embodiment, the input electrical signal 20 is sent through the electromagnetic transducer 30 in series with the speaker 11.

Figure 3A:
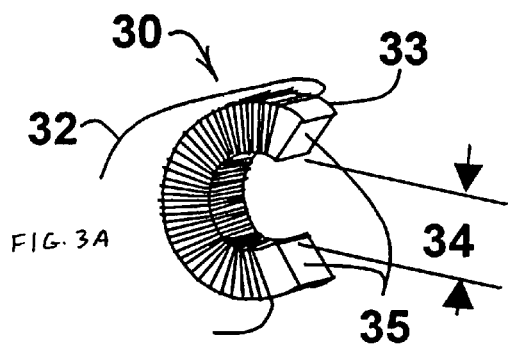
FIG. 3 shows the various core geometries and winding arrangements contemplated for use as sending transducers, and their resulting fringing fields.
Figure 3C:
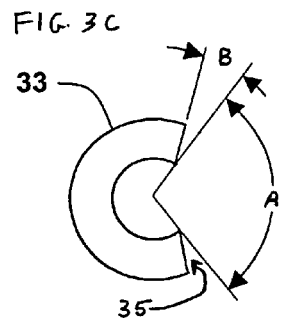
Figure 3B:
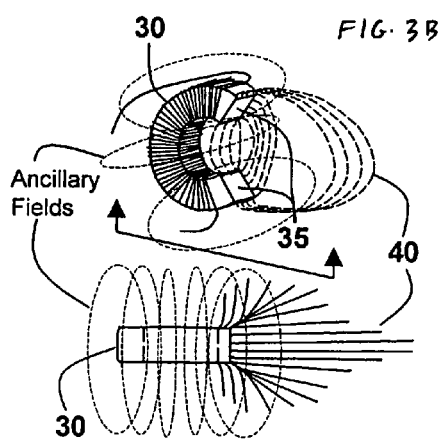

It is helpful at this point to describe the two critical transducer elements, which form the heart of the present invention. With reference now to FIGS. 3A-3D, the sending transducer 30 includes a plurality of electrically conductive driving windings 32 wound around a magnetic permeable core material 33, such as but not limited to ferrite. The core 33 takes the form of closed loop configuration but having a discontinuous core portion, the void of which forms an air gap 34 bounded by pole faces, as best shown in FIG. 3A. The size of the air gap controls flux density generated in the air gap 34. The air gap 34 is made larger to broaden the electromagnetic field and reduce sensitivity to field position relative to a receiving transducer 51. The pole face 35 configurations, additionally, influence field structure and field intensity 40, as best seen in FIG. 3B. The pole face 35 configuration influences the electromagnetic field 40 intensity through a phenomena identified as "fringing". This term is best described as the phenomena where the most intense fields are on the fringes or perimeter of the pole faces or where the sharp edges exist. Pole face 35 configurations can, therefore, be designed to create sharp edges where intense fields are needed or rounded to reduce the effect where they are not needed.

Figure 3D:
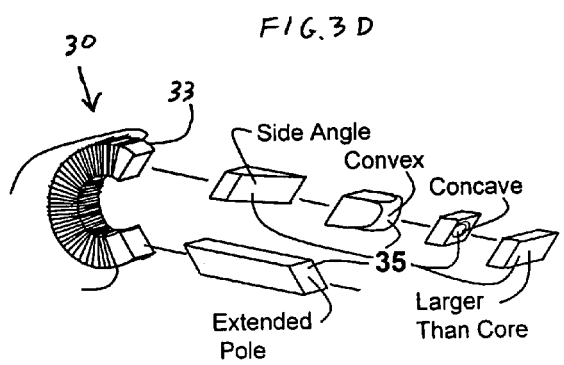

FIG. 3D shows a variety of pole face geometries that may be employed for the core 33. The preferred configuration of the air gap 34, as illustrated in FIG. 3C, is 90 to 180 degrees of arc (depicted as circumferential angle "A"), but is not limited to this range; and an opening angle (depicted as angle "B") across the pole faces 35 of 5 to 20 degrees, but not limited to this range. The preferred embodiment of the pole face 35 configuration, as best seen in FIGS. 3B and 3C, is sharp edges on all sides of each pole face.

In a sending transducer preferred embodiment the dimensions of the transducer core 33 are an outside diameter of 0.375 inch, inside diameter 0.187 inch by 0.94 inch axially with an air gap 34 of 0.180 inch with pole faces 35 that are open (5) degrees and flat. The core 33 may be wound with 150 to 400 turns of 35 to 41 gage magnet conductor. This design was discovered while attempting to improve the performance of toroidal coils with both cored and open-air designs, which have to be in intimate contact with its mating t-coil, or of a large diameter in order to be centered over a t-coil 51. The transducer 30 can be mounted directly in the handset unit 10 (or other signal producing unit) and oriented such that the transducer 30 is aligned for good transmitting efficiency to a receiving transducer 51/57.

Receiving transducer 51 of FIG. 4A, is an illustrative prior art device, widely called a t-coil. It consists of a bracket of magnetically permeable material 51A with electrically conductive windings 51B electrically connected to hearing aid circuitry 53. An improved receiving transducer, as seen in FIG. 4B, discloses a flat receiving transducer 56 of the present invention having a flat array of electrical conductors 57 that reduce its size and the winding volume, arrayed around a substantially rectangular, flat thin pole faced core 58. This design has a higher width to thickness ratio, and ideally generally straight pole faces 58 to more efficiently process the transmitted electromagnetic fields 40. An unexpected efficiency comes from managing the additive effects of the different field reception into this transducer. The effect is best explained with reference to FIG. 4C, wherein a 'snapshot' comprising an AC signal (not shown) instantaneously producing a north pole "N" to the left of the coil 32/57, and assuming a core 58 in place as illustrated in FIG. 4B. The transmitted field travels through the core inside of the coil creating a clockwise current $i_c$ in the coil 32/57, and the moving field expanding through the nearside compensatorily wound conductors of coil 32/57, the expanding field also creates a clockwise current $i_f$ such that the total current $i_t$ is additive as represented by $i_t = i_c + i_f$ of current due to that driven by core flux and that driven by the winding flux. Therefore, the susceptibility of this improved receiving transducer 56 to environmental electromagnetic interference or noise is reduced by virtue of this smaller, more compact flat coil design. This is achieved in contrast to the larger conventional t-coil 51 in FIG. 4A which is sensitive to and responds to mainly expanding field flux. However, the invention of the smaller improved flat coil 56 design, as seen in FIG. 4D in its preferred proximate alignment, will respond substantially to transducer 30, which creates both a core current and an additive field current, thus increasing the signal to noise ratio.

Referring now briefly to FIG. 1., as well as with continued reference to FIGS. 4B-4D, the received electromagnetic field 40 is then transformed in the receiving transducer 51/56 into a proportional electrical signal 20' the output of which is routed to the hearing aid 50. The signal is processed through hearing aid circuitry 53 via an amplifier 54 to a hearing aid speaker 55 producing improved acoustic output to the user's eardrum (shown in dashed lines).

Referring again to FIG. 1, the manner of using the invention involves using the handsets of phones (corded, cordless, wireless, radio handsets, etc.) and headsets all represented generically by the signal producing unit 10 with a very normal use model. A hearing aid user would have a switch (not shown) on their hearing aid that would allow them to switch to t-coil 51 mode or, as in some hearing aids, signals in the t-coil reception would be sensed and switching to t-coil mode would be automatically initiated (reference U.S. Patent Application 20030059076 "Hearing aid device with automatic switching to hearing coil mode"). Given the selection being completed, the user would simply respond with common and typical methods of announcing an incoming call with a ringing sound, a blinking light or a vibration mode as typically provided by the handset signaling an incoming call. If the signal producing unit 10, containing a speaker 11 is to operate electrically in a series circuit configuration, the handset is simply picked up and placed against the user's ear. Alternatively, in the case of switch 23, activation for the specific purpose of activating only the transducer 30 as seen in FIG. 2A can be accomplished through the multiply actuable switch 23. This same function can also be accomplished where the keyboard 17 is available on the involved device, whereby a simple code is keyed in as the handset is raised and placed next to the user's ear.

The electrical signal 20 designated for the speaker unit 11 is routed through the transducer 30 and the electromagnetic field 40 is generated and projected toward the t-coil 51 (or receiving transducer 56) in the hearing aid 50 in the user's ear. The electromagnetic field 40 is received by the t-coil 51 (or 56) mounted within the hearing aid and transformed back to a proportional signal processed by the hearing aid circuitry 53 and routed to the hearing aid eardrum speaker 55. All of the preceding hand movements are within the range of similar and normal actions on handsets or headsets. If the handset as represented by the unit 10 is a phone and it has volume control, then that can be adjusted or if the signal is too loud and the call is too short to make such an adjustment, a slight hand movement, such as rotation of the housing unit 10, can reduce the field strength impinging on the receiving t-coil 51 (or 56) and, thereby, reduce the resulting volume. In a similar manner, a headset as represented by unit 10 containing a speaker 11 and transducer 30 can be moved to produce a reduced volume achieving what normal users would do with regular acoustics input to a headset.

Referring now to FIG. 5 there is shown an effective technique ideally suited for use as an electromagnetic interference noise reduction means when employed in conjunction with the hearing aid related system 100. The simplified circuitry of FIG. 5 shows an arrangement wherein a transducer 30a (which may in some embodiments be identical or very close related to the transducer 30) is driven via windings 32a not by audio or data signals but by an excitation source 18 that provides an electrical signal of an appropriate frequency or frequencies which reduces environmental electromagnetic interference. This is an unexpected benefit that helps reduce environmental electromagnetic interference that is normally picked up by the t-coil in the hearing aid 50, that can be heard as buzzes or static.

This interference reduction action may be used as a stand alone feature (i.e., 30a and 32a only) for clearing up environmental electromagnetic interference, and in a proportional manner to facilitate use by t-coils in hearing aids and in cochlear implants. This interference reducing action may also be used in combination with the embodiment of FIG. 3A (i.e., windings 32 and 32a both used with transducer 30 and/or 30a) such that both voice and data transfer is accomplished via the driving winding 32 of FIG. 3A and interference noise reduction is also achieved via the windings 32a.

Although the invention has been described in terms of certain preferred and alternate embodiments, the invention should not be deemed limited thereto since other embodiments and modifications will readily occur to one skilled in the art. For example, the transducers described as 'substantially toroidal' or having air gaps of circumferential angular extents of varying degrees may have other configurations such as "U" shapes, helix, and rectangular or straight cores. Their cores can be common ferrite material or specialized highly permeable magnetic material in a homogenous core or a core of laminated construction. The transducers can be used in multiple arrangements or in distributed multiple locations. Receiving transducers described as 'substantially flat' coiled arrays may have other configurations such as thickness lesser than length or width and varying ratios of length to width. It is therefore to be understood that the appended claims are intended to cover all such modifications as fall within the true spirit and scope of the invention.

The invention claimed is:

1. Apparatus for communicating voice or data signals by electromagnetic induction from a signal producing device to an external hearing aid related device, comprising:
   (a) a sending transducer in said signal producing device, said sending transducer having a substantially toroidal core of permeable material surrounded by a driving winding;
   (b) said substantially toroidal core having an air gap of predetermined circumferential angular extent;
   (c) said sending transducer further having a pair of shaped pole faces formed at the circumferential extremities of said substantially toroidal core adjacent to said air gap, said pole faces giving rise to a fringing field; and
   (d) whereby upon production of voice or data signals by said signal producing device, said sending transducer produces a corresponding fringing field which may be applied to an external hearing aid related device thereby allowing replication of said voice or data signals by said external hearing aid related device.

2. The apparatus of claim 1 wherein said permeable material is selected from the group of materials including laminated structures, homogeneous materials, ferrites or combinations thereof.

3. The apparatus of claim 1 wherein said air gap predetermined circumferential angular extent is between 90 and 180.

4. The apparatus of claim 1 wherein said substantially toroidal core is further surrounded by an excitation winding, whereby upon application of excitation signals of selected frequencies to said excitation winding, interfering ambient electromagnetic noise signals in the vicinity of said sending transmitter are reduced.

5. The apparatus of claim 1 wherein said driving winding is an excitation winding, whereby upon application of excitation signals of selected frequencies to said excitation winding, interfering ambient electromagnetic noise signals in the vicinity of said sending transmitter are reduced.

6. A method of communicating voice or data signals by electromagnetic induction from a signal producing device to an external hearing aid related device, comprising the steps of:
   (a) providing a sending transducer in said signal producing device, said sending transducer having a substantially toroidal core of permeable material surrounded by a driving winding, said substantially toroidal core having an air gap of predetermined circumferential angular extent;
   (b) said sending transducer further having a pair of shaped pole faces formed at the circumferential extremities of said substantially toroidal core adjacent to said air gap, said ole faces giving rise to a fringing field; and
   (c) whereby upon production of voice or data signals by said signal producing device, said sending transducer produces a corresponding fringing field which may be applied to an external hearing aid related device thereby allowing replication of said voice or data signals by said external hearing aid related device.

7. The method of claim 6 wherein said providing step further includes providing said sending transducer with an air gap of between 90 and 180 circumferentially angular degrees.

8. A method of communicating voice or data signals by electromagnetic induction to a hearing aid related device from an external electromagnetic sending transducer, comprising the steps of:
   (a) providing a receiving transducer in said hearing aid related device, said receiving transducer having a flat, substantially rectangular elongated core of permeable material surrounded by a sensing winding, said substantially rectangular core having a substantially rectangular cross-section such that a thickness of the core is lesser than its width and a length of the core is lesser than its width;

(b) said substantially rectangular elongated core having a pair of generally straight coplanar pole faces located at its longitudinal extremities;

(c) whereby upon reception of voice or data signals by electromagnetic induction from an external electromagnetic sending transducer, said receiving transducer replicates said voice or data signals in a form suitable for application to and use in said hearing aid related device.

9. A pair of transducers for transferring voice or data signals therebetween by electromagnetic inductive coupling, comprising:

(a) a sending transducer having a substantially toroidal core of permeable material surrounded by a driving winding, said substantially toroidal core having an air gap of predetermined circumferential angular extent;

(b) a pair of shaped pole faces formed at the circumferential extremities of said substantially toroidal core adjacent to said air gap, said pole faces giving rise to a fringing field;

(c) a receiving transducer having a flat, substantially rectangular elongated core of permeable material surrounded by a sensing winding, said substantially rectangular core having a thickness lesser than its width and a length lesser than its width;

(d) a pair of generally straight pole faces located at the longitudinal extremities of said substantially rectangular core; and (e) whereby upon applying input voice or data signals to said driving winding there is electromagnetically induced in said sensing winding an output replica of said signals.

10. The pair of transducers of claim 9 wherein said sending and receiving transducers are located in separate and distinct electronic devices which are physically brought into proximity to effect said electromagnetically induced input signal replication.

11. The pair of transducers of claim 9 wherein said sending and receiving transducers are located in separate and distinct electronic devices which are physically brought into proximity to effect said electromagnetically induced input signal replication.

12. The pair of transducers of claim 11 wherein said separate and distinct devices comprise signal producing devices selected from the group including wired phones, wireless phones, cordless phones, two-way radio handsets, phone integrated PDA's, and hearing aid related devices.

13. The pair of transducers of claim 12 wherein said sending transducer is located in said signal producing device and said receiving transducer is located in said hearing aid related device.

14. A method of communicating voice or data signals between separate and distinct electronic device by electromagnetic induction, comprising the steps of:

(a) providing a sending transducer having a substantially toroidal core of permeable material surrounded by a driving winding, said substantially toroidal core having an air gap of predetermined circumferential angular extent;

(b) said sending transducer having a pair of shaped pole faces formed at the circumferential extremities of said substantially toroidal core adjacent to said air gap, said pole faces giving rise to a fringing field, said sending transducer located in a signal producing device;

(c) providing a receiving transducer having a flat, substantially rectangular elongated core of permeable material surrounded by a sensing winding, said substantially rectangular core having a thickness lesser than its width and a length lesser than its width;

(d) said receiving transducer having a pair of generally straight pole faces located at the longitudinal extremities of said substantially rectangular core, said receiving transducer located in a hearing aid related device; and (e) positioning said signal producing device in proximity to said hearing aid related device whereby voice or data signals from said signal producing device are electromagnetically induced into and replicated by said hearing aid related device.

15. The method of claim 14 wherein said positioning step includes varying the proximity of said signal producing device with respect to said hearing aid device so as to alter at least the volume of said replicated voice or data signals.

* * * * *